J. N. Karr,
Attch'g Door Knobs.
No. 110,977.    Patented Jan. 17, 1871.
Fig. I.
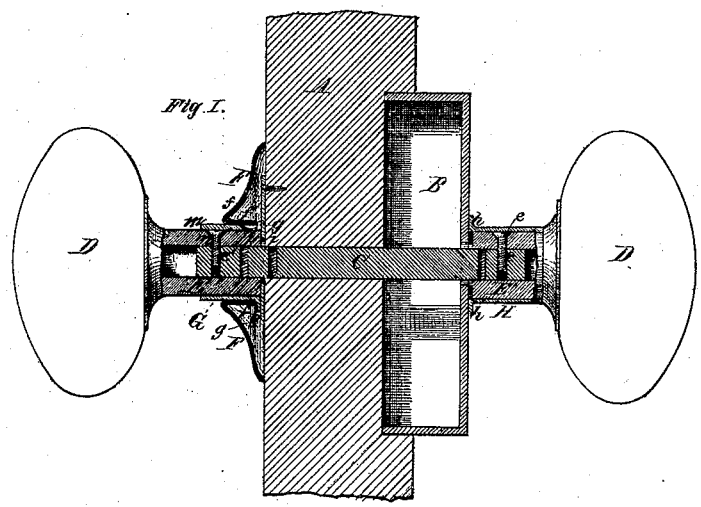
Fig. II.
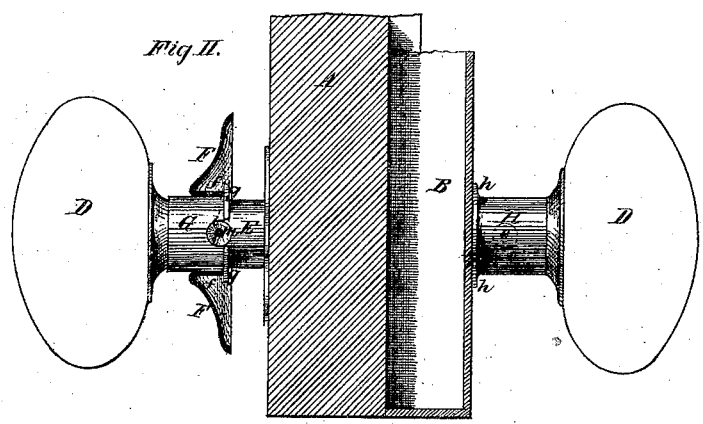
Witnesses:          Jas. N. Karr, Inventor
                    by Furbush & Hyatt
                    Att'ys

United States Patent Office.

JAMES N. KARR, OF BUFFALO, NEW YORK.

Letters Patent No. 110,977, dated January 17, 1871.

IMPROVEMENT IN ATTACHING DOOR-KNOBS TO THEIR SPINDLES.

The Schedule referred to in these Letters Patent and making part of the same.

I, JAMES N. KARR, of the city of Buffalo, in the county of Erie and State of New York, have invented certain Improvements in the Attachment of Door-Knobs to their Spindles, of which the following is a specification.

The collet or shank of door-knobs is usually fastened to the spindle by means of a small screw passing through the collet into the latter. This screw, from the jar and rattling to which doors are subjected, especially on rail-cars, frequently gets loose and works out, resulting in the detachment of the knob. To prevent this, a sleeve or thimble fitting over the shank and covering the head of the screw or coupling-pin has been employed, the coupling-pin in such case being inserted through a hole or slot which is given a partial revolution on the shank to break the co-incidence between the hole and screw-head. This device has been found objectionable for plated or finely-finished knobs.

My invention consists in the special construction and arrangement of a sleeve with the rosette, shank, and hole for the coupling-screw, in such a manner as to permit the rosette to be slid back on the sleeve to expose the hole for the insertion of the screw, the head of which is then covered by sliding the sleeve over it, a flange on the inner end of the sleeve preventing its disconnection from the rosette as the latter is adjusted and secured in place.

In the accompanying drawing—

Figure I is a vertical section in line of the spindle, showing my improved mode of attachment.

Figure II is a plan view representing the sleeve and rosette in the position required for inserting the coupling-screw.

Like letters of reference indicate like parts in both of the figures.

A represents the door;
B, a lock, secured to the face thereof;
C, the spindle, passing through the door;
D D, the knobs;
E and E', the collets or shanks thereof, which fit on the ends of the spindles, and are secured by screws $e$ $e'$ in the usual manner, except that the hole for the screw in the shank E is made nearer its end;
F is a rosette of ordinary construction; and
G, my improved sleeve, provided with an inner flange, $g$, designed for the shank E.

For inserting the screw $e$, the sleeve and rosette are slid back in the position indicated in Fig. II, which leaves sufficient space between the rosette and the door for the purpose.

The inner end of the sleeve, when the shank is required to be made unusually short, may have a notch, $i$, formed therein to expose the screw-hole $m$, as shown in Fig. II.

The screw being inserted, the rosette is slid in place, fastened to the door, the edge of the flange $f$ of the rosette engaging with the flange $g$ of the sleeve, and bringing the latter in the position shown in Fig. I, in which it entirely covers the head of the coupling-screw.

This construction and arrangement of the sleeve G and rosette enable a much shorter shank for the knob to be used, as the rigid attachment of the sleeve to and projection from the rosette will obviously prevent the sliding back of the latter for inserting the coupling-screw, unless the shank is made the length of the sleeve longer than is required by my improved arrangement.

H represents the thimble, provided with a flange, $h$, and designed for the shank on the lock-side of the door.

The shank E being first secured to the spindle by the screw $e'$, the thimble is slipped in place on the shank, and the spindle passed through the lock and door, when the opposite knob is attached in the manner hereinbefore described.

The construction and application of the thimble H, dispense with the use of an abutting flange on the end of the shank E', and being a separate piece from the shank and entirely incasing the same, it not only effectually conceals the screw-head and retains it in place, but, on account of the facility with which it can be plated, or be made of finer metal, enables the shank to be ornamented to a degree, and at a cost not attainable by the other modes of construction.

What I claim as my invention is—

The sleeve G, when provided with a flange, $g$, and arranged so as to operate with the rosette F, shank E, and screw-hole $m$, substantially in the manner and for the purposes hereinbefore set forth.

JAMES N. KARR.

Witnesses:
JAY HYATT,
JNO. J. BONNER.